(12) United States Patent
Draper et al.

(10) Patent No.: US 8,177,886 B2
(45) Date of Patent: May 15, 2012

(54) USE OF OXYGEN CONCENTRATORS FOR SEPARATING $N_2$ FROM BLAST FURNACE GAS

(75) Inventors: Sam David Draper, Greenville, SC (US); Shahryar Rabiei, Greenville, SC (US)

(73) Assignee: General Electric Company, Schenectady, NY (US)

( * ) Notice: Subject to any disclaimer, the term of this patent is extended or adjusted under 35 U.S.C. 154(b) by 451 days.

(21) Appl. No.: 12/436,849

(22) Filed: May 7, 2009

(65) Prior Publication Data

US 2010/0282078 A1 Nov. 11, 2010

(51) Int. Cl.
*B01D 53/02* (2006.01)

(52) U.S. Cl. ........... 95/130; 95/35; 95/47; 95/81; 95/96; 96/80

(58) Field of Classification Search ............. 95/35, 47, 95/81, 96, 130; 96/80
See application file for complete search history.

(56) References Cited

U.S. PATENT DOCUMENTS

| | | | |
|---|---|---|---|
| 434,216 A | 8/1890 | Verrell | |
| 3,420,040 A | 1/1969 | Neely et al. | |
| 3,672,502 A | 6/1972 | Janich | |
| 3,784,370 A * | 1/1974 | Stephenson, Jr. | 75/464 |
| 4,133,655 A | 1/1979 | DeCardenas | |
| 4,190,424 A | 2/1980 | Armond et al. | |
| 4,302,224 A | 11/1981 | McCombs et al. | |
| 4,331,455 A | 5/1982 | Sato | |
| 4,342,573 A | 8/1982 | McCombs et al. | |
| 4,345,939 A * | 8/1982 | Ratschat | 75/466 |
| 4,359,328 A * | 11/1982 | Wilson | 95/98 |
| 4,386,945 A | 6/1983 | Gardner | |
| 4,400,575 A * | 8/1983 | Frost | 585/733 |
| 4,409,023 A * | 10/1983 | Weber et al. | 75/492 |
| 4,420,314 A | 12/1983 | Barron, Jr. | |
| 4,448,592 A | 5/1984 | Linde | |
| 4,477,264 A | 10/1984 | Kratz et al. | |
| 4,576,616 A | 3/1986 | Mottram et al. | |
| 4,586,634 A | 5/1986 | Minter et al. | |
| 4,636,226 A | 1/1987 | Canfora | |
| 4,661,125 A | 4/1987 | Haruna et al. | |
| 4,732,577 A * | 3/1988 | Koizumi et al. | 95/101 |
| 4,733,528 A * | 3/1988 | Pinto | 60/39.12 |
| 4,744,803 A | 5/1988 | Knaebel | |
| 4,853,015 A | 8/1989 | Toshino | |
| 4,869,733 A | 9/1989 | Stanford | |
| 4,877,427 A | 10/1989 | Smith et al. | |
| 4,917,711 A * | 4/1990 | Xie et al. | 95/106 |
| 4,973,339 A | 11/1990 | Bansal | |
| 4,985,052 A | 1/1991 | Haruna et al. | |
| 5,137,549 A | 8/1992 | Stanford et al. | |
| 5,236,467 A * | 8/1993 | Fritz | 44/438 |
| 5,425,229 A | 6/1995 | vanAckeren et al. | |
| 5,458,677 A | 10/1995 | VanderMolen | |
| 5,518,526 A | 5/1996 | Baksh et al. | |

(Continued)

*Primary Examiner* — Robert J Hill, Jr.
*Assistant Examiner* — Christopher P Jones
(74) *Attorney, Agent, or Firm* — Nixon & Vanderhye PC

(57) ABSTRACT

A method of continuously removing nitrogen from a blast furnace exhaust stream containing oxygen, nitrogen and unburned hydrocarbons in order to form a supplemental feed to a gas turbine engine containing residual hydrocarbon fuel by first removing entrained solid particulates in the blast furnace exhaust stream to create a substantially particulate-free gas, passing the particulate-free stream through at least one separator bed containing an adsorptive material capable of adsorbing nitrogen from air, adsorbing substantially all of the nitrogen as interstitial nitrogen on solids within the separator bed, feeding non-adsorbed hydrocarbon fuel and oxygen components leaving the separator to a gas turbine engine and removing the adsorbed nitrogen from the separator bed.

8 Claims, 1 Drawing Sheet

U.S. PATENT DOCUMENTS

| | | |
|---|---|---|
| 5,520,720 A | 5/1996 | Lemcoff |
| 5,529,607 A | 6/1996 | Tan |
| 5,679,134 A | 10/1997 | Brugerolle et al. |
| 5,766,310 A | 6/1998 | Cramer |
| 5,928,610 A | 7/1999 | Moran et al. |
| 5,961,694 A | 10/1999 | Monereau et al. |
| 5,997,611 A | 12/1999 | Doong et al. |
| 6,214,084 B1 * | 4/2001 | Saxena et al. .................. 75/453 |
| 2004/0099138 A1 * | 5/2004 | Karode et al. ................. 95/214 |

* cited by examiner

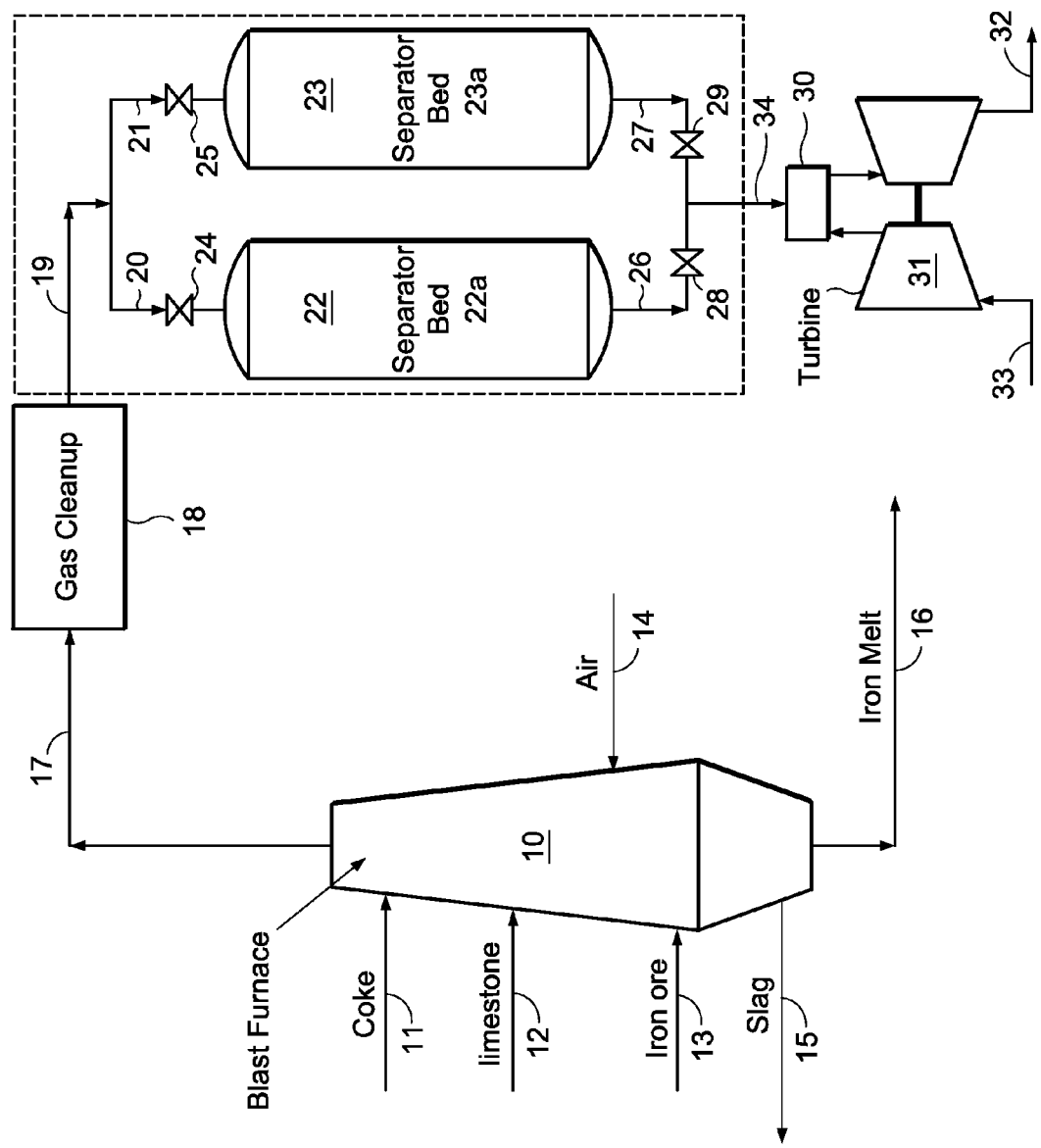

USE OF OXYGEN CONCENTRATORS FOR SEPARATING $N_2$ FROM BLAST FURNACE GAS

BACKGROUND OF THE INVENTION

The present invention relates to a method for using the excess heat and mechanical energy available in foundry blast furnace gases and, more particularly, to a process for treating high temperature blast furnace exhaust gases that contain residual amounts of unburned hydrocarbon fuel to form a clean, supplemental combustion gas and working fluid for a gas turbine engine.

It is known that blast furnace operations that reduce iron ore to commercial grade iron and steel suffer from significant thermal inefficiencies. A typical blast furnace only uses about 66% of the total heat energy supplied to the metallurgical plant to produce crude iron, with significant quantities of air being required to burn the coke feed. It is also known that blast furnace exhaust streams often contain useful amounts of unburned hydrocarbons that must be released, treated or remain unused during the iron ore reduction process.

Past efforts to conserve heat energy generated during and after blast furnace operations have focused primarily on reducing the amount of fuel necessary to perform the initial foundry operation, such as reducing the amount of coke gas, natural gas or heating oil used to heat the iron ore. Other methods have attempted to recycle heat from the blast furnace exhaust gases to support the initial extraction of iron ore on the theory that the economics of any metallurgical process can be improved by increasing the input temperature of the fuel gas feed.

A limited number of techniques have also been proposed in recent years to improve the thermal efficiency of a foundry operation by making better use of the heat and potential work of the blast furnace exhaust in downstream operations, including gas streams driving rotating pieces of equipment that generate electricity. However, these known processes suffer from significant thermal inefficiencies, as well as operational problems due to the presence of solid particulates in the exhaust gas. In addition, for smaller size foundry furnaces, the electrical generating capacity of an associated gas turbine engine may not be economically justified.

The initial investment to purchase and install the required generating equipment can be prohibitively expensive, making the time to recover an investment in a downstream process unacceptably long. Many so-called "combined" plants also do not have sufficient space to accommodate the relatively complex and expensive equipment necessary to generate electricity from exhaust blast furnace gases primarily because of the need to accommodate large amounts of nitrogen introduced into the blast furnace in the form of ambient air at the outset of the foundry operation. A nominal exhaust gas stream from a conventional blast furnace contains about 45-50% by volume nitrogen.

Thus, to date, most conventional plants treating blast furnace exhaust gas cannot fully recapture the fuel value or potential work of the exhaust gas as it leaves the blast furnace. Typically, the gas emerges from the furnace at a pressure of between 1.5 and 2.0 bar gauge with a relatively high sensible heat content (gas temperatures typically range between 150° and 200° C.). The exhaust gases also contain nitrogen and a residual amount of unburned hydrocarbon fuel in gaseous form. Attempts have been made to recover the residual fuel components and/or to use the work force available from the exiting blast furnace gases. Invariably, however, such process have met with limited success because of the presence of nitrogen, carbon dioxide and carbon monoxide in the exhaust that tend to lower the fuel value for any later use, particularly in a gas turbine engine.

The potential therefore exists to increase the overall thermal efficiency of a combined fuel feed to a gas turbine engine, provided the amount of nitrogen fed to the turbine engine can be significantly reduced. In the past, molecular sieves have been used on a small scale to separate $N_2$ from ambient air using commercially available "oxygen concentrators." One prior method known as "pressure swing adsorption" ("PSA") has been used successfully to separate a particular gas species from a mixture of gases under pressure based on the species' molecular characteristics and affinity for an adsorbent material. PSA operates at near-ambient temperatures and thus differs from cryogenic distillation techniques causing gas separation. Special adsorptive materials serve as a molecular sieve, preferentially adsorbing a target gas species at high pressure. The process then swings to low pressure to desorb the adsorbent material.

For various reasons, conventional oxygen concentrators employing PSA technology cannot be used effectively on a larger scale to treat blast furnace exhaust gases or to create a supplemental feed to a gas turbine engine. For example, conventional oxygen concentrators simply are not effective in removing other byproducts of blast furnace combustion, such as carbon monoxide, carbon dioxide or argon present in the blast furnace exhaust stream.

Exhaust gases from a foundry blast furnace pose another significant problem that makes the raw gas unacceptable for use in downstream gas turbine engines. The gas cannot be fed directly into the combustor or any stage of a power generating gas turbine engine due to the presence of solid particulates generated and entrained in the exhaust gas during the original blast furnace operation. Manufacturers of gas turbine engines normally require a maximum inlet particulate loading of about 5 mg/Nm³. Thus, before any blast furnace gas can qualify for use in a gas turbine engine, it must undergo cleaning in order to transform the gas from its initial "dirty" condition (typically 8.10 g/Nm³) to the standards required for a gas turbine inlet.

BRIEF DESCRIPTION OF THE INVENTION

The process of separating nitrogen from a blast furnace exhaust stream according to the present invention includes the basic steps of (1) removing entrained solid particulates in the blast furnace exhaust stream (normally containing about 45-50% nitrogen, oxygen, residual hydrocarbon fuel compounds and carbon particulates) to form a substantially particulate-free gas stream; (2) passing the particulate-free stream through at least one separator bed containing an adsorptive material capable of adsorbing nitrogen from air in the gas stream; (3) adsorbing substantially all of the nitrogen present in the gas stream as interstitial nitrogen on solids residing in at least one separator bed; (4) feeding any non-adsorbed hydrocarbon fuel and oxygen components that exit the separator into a gas turbine engine as a supplemental fuel; and (5) removing the adsorbed nitrogen from the separator bed.

BRIEF DESCRIPTION OF THE DRAWINGS

FIG. 1 is a process flow diagram of an exemplary embodiment of the present invention showing the major pieces of equipment and key process streams for removing substantially all of the free nitrogen present in a blast furnace gas stream prior to introducing the stream into a gas turbine engine.

DETAILED DESCRIPTION OF THE INVENTION

As noted above, the main constituent gases of the blast furnace exhaust gases include nitrogen, carbon dioxide, carbon monoxide, oxygen, small amounts of inert compounds (e.g. argon) and residual unburned hydrocarbon fuel elements. The separator/concentrator system of the present invention removes a substantial portion of the free nitrogen, thereby increasing the amount of attainable oxygen and gaseous hydrocarbons. In exemplary embodiments of the invention, the step of removing entrained solid particulates reduces the particulate concentration down from about 8.1 g/Nm$^3$ down to a level of about 5 mg/Nm$^3$. Preferably, the adsorptive materials useful in carrying out the process include a molecular sieve containing beads of zeolite, activated carbon, silica gel or alumina. The method according to the invention also contemplates using a plurality of separator beds operating in parallel, i.e., where at least one of the separator beds adsorbs nitrogen while the remaining beds operate to remove already adsorbed nitrogen.

Significantly, the present invention first processes and then utilizes blast furnace exhaust gas in a manner that improves the overall efficiency of a downstream gas turbine engine. The $N_2$ content of most blast furnace gases typically ranges between 45 and 50% by volume on a dry basis. Although the exhaust gases contain usable amounts of oxygen and hydrocarbon fuel, the amount of nitrogen present in the blast furnace gas significantly lowers the heating value of the gas. The amount of nitrogen and combustion by-products in the gas stream also make it difficult and expensive to isolate any remaining hydrocarbon fuel using conventional gas purification methods.

Thus, in one exemplary embodiment, the invention uses beds of molecular sieves on a much larger scale as compared to conventional oxygen "concentrators" in order to selectively remove nitrogen and potentially other gases such as CO and $CO_2$, thereby significantly increasing the percentage of oxygen while increasing the inherent heat value and potential work force of the exhaust gas. Conventional oxygen concentrators have been used in the past to produce high purity oxygen (typically in the range of between 50-95%, depending on the input to the concentrators), but not under the flow conditions typical of blast furnace gas streams. It has now been found that manipulating the molecular sieve properties for the blast furnace gas stream and removing nitrogen under the process flow conditions described below significantly improve the overall thermal efficiency of a downstream gas turbine. Once gases such as nitrogen are removed, gas capturing-technologies such as amine or membrane separation units can be employed to increase the gas heat value even further. In addition, by recovering the thermal and work energy in the blast furnace gas, the foundry will be much more energy-efficient and more "green" from an environmental standpoint.

The separator beds (referred to herein as "nitrogen removal beds") operate on the same general principle as oxygen concentrators known as "pressure swing adsorption" or "PSA." Here, the PSA method relies on pressure shifts across different adsorbent separator beds operating in parallel in order to decrease the amount of one particular constituent (nitrogen) in the gas mixture fed to the beds. In most pressure swing adsorption processes, gases under pressure tend to be attracted to solid surfaces ("adsorbed") under increased pressure. When the pressure is reduced, the gas can be released, or "desorbed" and removed from the system.

A modified PSA process has been found useful in separating nitrogen in the blast furnace exhaust because the nitrogen tends to be attracted to solid surfaces of the bed material to a different degree than other constituents, particularly oxygen. An exemplary embodiment of the invention uses at least two beds operating in parallel. When one bed reaches the end of its capacity to adsorb nitrogen, the bed can be regenerated by reducing the pressure and releasing the adsorbed nitrogen. The bed is then ready to begin another cycle of producing an exit gas depleted of nitrogen but higher in oxygen and residual hydrocarbon fuel components. Because the PSA process preferentially adsorbs nitrogen over oxygen, the pressurized air in contact with the adsorbent contains a significantly higher percentage by volume of oxygen. The oxygen enriched gas stream can be continuously vented from the adsorption zone (e.g., as a supplemental feed to a gas turbine combustor) while the adsorbed nitrogen is being purged at reduced pressure conditions.

Different types of PSA bed materials, including zeolite or methyl oxide beads have been found effective in removing nitrogen from the exhaust stream, despite the presence of other constituents such as carbon monoxide and inert compounds. Again, by using a plurality of pressure swing adsorption beds operating in parallel as described herein, the nitrogen passing through the beds can effectively be removed in a tandem manner, substantially increasing the amount of residual oxygen and unburned hydrocarbon components remaining in the exhaust gas.

The process depicted in FIG. 1 shows each of two separators (concentrators) operating in parallel, with each separator including a main inlet and outlet gas control valve for the blast furnace exhaust undergoing treatment, as well as a molecular sieve bed containing the nitrogen absorbent media (typically in bead form). During the charge cycle of the first molecular sieve bed, the first inlet and outlets valves are opened and the second inlet and outlet valves closed to permit the nitrogen in the exhaust gas feed to be adsorbed in the first separator. As the adsorption process proceeds, the amount of free nitrogen, i.e., nitrogen that that cannot be adsorbed, leaving the first separator will gradually increase over time until the amount reaches a threshold concentration level at which the feed to the first separator must be switched to the separator operating in parallel.

During the charge cycle of the second molecular sieve bed, the first input and output valves are closed and the second input and output valves opened to allow flow through the separator into the gas turbine. After completion of the charge cycle of each respective molecular sieve bed, an outlet valve for that particular separator can be opened to allow the interstitial nitrogen resident on the adsorption beads to be removed from the separator while the second separator is still charging.

Adsorbents for PSA systems useful in carrying out the invention shown in FIG. 1 typically include porous materials chosen because of their large surface areas. Typical adsorbents include activated carbon, silica gel, alumina and zeolite beads. Although, the gas adsorbed on the surfaces typically consists of a single gas layer, the beads are capable of adsorbing a significant fraction of their weight in nitrogen. Thus, zeolites and activated carbon ("carbon molecular sieves") have sieve characteristics capable of excluding gas molecules based on size and restricting the ability of the larger molecules to be adsorbed. In this case, the beds preferentially adsorb free nitrogen and allow oxygen and residual hydrocarbons to be continuously vented from the separators.

Referring specifically to FIG. 1, a conventional blast furnace configuration includes the blast furnace 10 itself sized to receive iron ore feed 13, coke 11, limestone 12 and ambient air 14 as the primary combustion reactants that reduce the iron ore to produce iron melt 16. The resulting waste slag 15 is removed from the blast furnace on a continuous basis when the furnace operates at a steady state condition. The gas stream leaving the blast furnace includes a substantial fraction of nitrogen, unused oxygen, argon and a residual amount of unburned hydrocarbons generated during the blast furnace operation, all of which are combined in blast furnace exhaust stream 17 leaving the furnace as shown. The hard particulate components that must be removed from the system before the gas stream can be used in any downstream turbine operation are removed as shown generally in gas cleanup step 18 and can include, for example, an electrostatic precipitator.

The resulting cleaner, i.e., particulate-free blast furnace exhaust stream 19 passes through nitrogen separators ("concentrators") 22 and 23 with separator beds 22a and 23a operating in parallel as shown in order to provide the continuous use of the blast furnace exhaust as feed to gas turbine engine 31. In one operational sequence, separators 22 and 23 each include main inlet and outlet lines 20, 21, 26, and 27, with corresponding gas control valves 24, 25, 28 and 29, respectively, for controlling the blast furnace exhaust gas undergoing treatment using parallel separators operating in sequence. Each of the separators includes a molecular sieve bed containing the nitrogen absorbent media (typically in bead form). During the charge cycle of the first molecular separator bed, the first inlet and outlet valves 24 and 28 are opened and the second inlet and outlet valves 25 and 29 closed to permit the nitrogen in the exhaust gas feed to be adsorbed in the'first separator.

Once a threshold adsorption level is reached in the first separator, control valves 24 and 28 are closed and valves 25 and 29 in separator 23 opened to allow for a continuous nitrogen removal process. The adsorbed nitrogen in each separator can then be removed (vented) from the system by reducing the pressure in each fully charged separator as described above. FIG. 1 also illustrates how the resulting essentially nitrogen-free and particulate-free product stream from separators 22 and 23 can be fed via separator discharge line 34 directly into the combustion box 30 of the gas turbine engine 31 depicted with conventional input and exhaust streams 33 and 32.

As indicated above, by using a modified PSA process, the present invention takes advantage of repeated cycles of alternating pressure sequences in different nitrogen absorbent beds. The end result is a continuous, and more efficient concentrator operation conducted over time and the capability to treat blast furnace exhaust gases on a much larger scale than the small, conventional oxygen concentrators. Multiple bed systems such as that shown in FIG. 1 thus serve to increase the concentrator efficiency and increase overall gas throughput to a downstream gas turbine engine.

FIG. 1 also shows the use of a dust extraction component (shown generally as "gas cleanup" stage 18, which could include, for example, an electrostatic precipitator) necessary for treating blast furnace gas exhausts before the gas passes through the parallel concentrators. Particle extraction systems useful in the present invention can include both preliminary and fine dust particle cleaning stages. For example, a preliminary cleaning stage may include a vertical pressure vessel connected directly to the blast furnace throat whereby furnace gas enters the pressure vessel vertically from the main exhaust gas pipe. An increase in cross-section upon entry into the pressure vessel results in a reduction of gas velocity. The coarsest particles fall vertically from the gas flow before the flow leaves the dust catcher at the top of the pressure vessel. The separated particles are then collected in a dust hopper and removed at the bottom of the pressure vessel. The pre-cleaned blast furnace gas passes from the dust catcher to a fine cleaning stage which normally includes at least one gas scrubber or electrostatic precipitator (e.g. cleanup stage 18 in FIG. 1) which removes the remaining smallest entrained particulates.

The blast furnace gas can also be passed through a cyclone separator (not shown) after leaving the dust catcher and before being passed to the fine cleaning stage. A cyclone separator normally includes one or more separators connected in parallel. The blast furnace gas is fed tangentially at high speed such that the particles are thrown by centrifugal force to the outer wall of the cyclone separator and slide down this outer wall into a dust hopper.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of removing nitrogen from a blast furnace exhaust stream containing air and unburned hydrocarbons to form a supplemental feed to a gas turbine engine, comprising the steps of:
   removing substantially all of the entrained solid particulates in said blast furnace exhaust stream to form a substantially particulate-free gas stream;
   passing said substantially particulate-free gas stream through a first one of a plurality of separator beds operating in parallel, with each separator bed comprising an adsorptive material capable of adsorbing nitrogen from air in said particulate-free gas stream and wherein said adsorptive material forms a molecular sieve comprising beads of zeolite, activated carbon, silica gel or alumina;
   adsorbing substantially all of the nitrogen in said particulate-free gas stream as interstitial nitrogen on solids within said first one of said plurality of separator beds;
   feeding non-adsorbed hydrocarbon fuel and oxygen components in said substantially particulate-free gas stream to said gas turbine engine following the adsorption of said nitrogen by said first one of said separator beds; and
   simultaneously exhausting adsorbed nitrogen from a second one of said plurality of separator beds.

2. A method according to claim 1, wherein said step of removing entrained solid particulates reduces the particulate from about 8.1 g/Nm$^3$ down to a level of about 5 mg/Nm$^3$.

3. A method according to claim 1, wherein said steps for removing nitrogen from said blast furnace exhaust stream are carried out as a continuous process.

4. A method according to claim 1, wherein the amount of nitrogen present in said blast furnace exhaust stream is about 45 to 50% by volume.

5. A method according to claim 1, further comprising the step of passing said particulate-free gas stream through an amine or membrane separation unit before feeding said gas stream to said gas turbine engine.

6. A method according to claim 1, wherein said step of removing entrained particulates includes first passing said blast furnace exhaust through a cyclone separator.

7. A method according to claim 1, wherein at least one of said separator beds operates to adsorb nitrogen while at least one of the remaining separator beds operates to exhaust adsorbed nitrogen from the beds.

8. A method according to claim 7, wherein said one of the remaining separator beds is regenerated periodically by reducing the operating pressure of said bed to release nitrogen.

* * * * *